United States Patent
Ardichvili et al.

(10) Patent No.: US 7,710,942 B2
(45) Date of Patent: May 4, 2010

(54) UMTS RECEIVER SYMBOL SYNCHRONIZATION

(75) Inventors: Emmanuel Ardichvili, Valbonne (FR); Martial Gander, Le Muy (FR)

(73) Assignee: ST-Ericsson SA, Geneva (CH)

( * ) Notice: Subject to any disclaimer, the term of this patent is extended or adjusted under 35 U.S.C. 154(b) by 535 days.

(21) Appl. No.: 10/584,097

(22) PCT Filed: Dec. 14, 2004

(86) PCT No.: PCT/IB2004/004218

§ 371 (c)(1),
(2), (4) Date: Jun. 22, 2006

(87) PCT Pub. No.: WO2005/064810

PCT Pub. Date: Jul. 14, 2005

(65) Prior Publication Data

US 2007/0160119 A1  Jul. 12, 2007

(30) Foreign Application Priority Data

Dec. 23, 2003  (EP)  .................. 03300285

(51) Int. Cl.
*H04J 3/06* (2006.01)
*H04B 1/00* (2006.01)

(52) U.S. Cl. .................. 370/350; 375/148; 375/149

(58) Field of Classification Search .................. 370/350, 370/320; 375/148, 149, 140, 10.2, 150, 152, 375/295
See application file for complete search history.

(56) References Cited

U.S. PATENT DOCUMENTS

| | | | | |
|---|---|---|---|---|
| 4,977,578 | A | * | 12/1990 | Ishigaki et al. .............. 375/140 |
| 5,684,828 | A | * | 11/1997 | Bolan et al. ................ 340/10.2 |
| 5,856,998 | A | * | 1/1999 | Durrant et al. .............. 375/150 |
| 6,282,234 | B1 | | 8/2001 | Kamemo et al. |
| 6,377,606 | B1 | | 4/2002 | Toskala et al. |
| 2004/0184513 | A1 | * | 9/2004 | Lundby et al. .............. 375/148 |

* cited by examiner

*Primary Examiner*—Charles N Appiah
*Assistant Examiner*—Kiet Doan
(74) *Attorney, Agent, or Firm*—William J. Kubida; Michael C. Martensen; Hogan & Hartson LLP (57) ABSTRACT

The present invention relates to a method of performing time drift compensation in a receiver (200) and a receiver (200) for performing time drift compensation. The basic idea of the invention is that a signal is received at the receiver. A control pulse is produced after a certain number of chips of the received signal has been received. A variable delay that is applied to the received signal is controlled by means of the control pulse. The resulting delayed signal is supplied to demodulation units (202, 203) in the receiver, in which delayed signal chips have been omitted or duplicated. A compensation signal is supplied to the demodulation units in the receiver, and this compensation signal indicates whether chips have been omitted or duplicated in the delayed signal. Finally, the delayed signal is demodulated such that the demodulation units consider the omission or duplication of chips in the delayed signal.

19 Claims, 5 Drawing Sheets

UMTS RECEIVER SYMBOL SYNCHRONIZATION

FIELD OF THE INVENTION

The present invention relates to a method of performing time drift compensation in a receiver and a receiver for performing time drift compensation.

BACKGROUND OF THE INVENTION

In UMTS (Universal Mobile Telecommunications Service) data processing, data pertaining to different propagation paths reach a mobile station at different instants of time. Moreover, said data may reach the mobile station from the same or different transmitting sources, i.e. base stations. The information transmitted in each path in the air interface is sampled, demodulated and delayed at the receiver, and then combined with the correspondingly processed information of the other paths to improve the quality of the received signals.

In CDMA systems, spreading is used to translate each symbol into a sequence of bits. At the transmitter, each symbol is multiplied with a wideband spreading code. The higher the bandwidth used to transmit a signal, the lower the required signal-to-noise rate must be. When a higher bandwidth is employed, the signal is spread over a greater spectrum, and that makes the signal more tolerant to interference. The spreading code is also known as the channelization code and is used to distinguish the different channels. The spreading code comprises N bits, or chips, per symbol. Each symbol to be transmitted is converted into a longer sequence of chips, by means of the multiplication. The length of the spreading code, i.e. the number of chips comprised in each spreading code, is known as the spreading factor and is dependent on the channel type. At the receiver, the original symbols can be reconstructed by multiplying the received sequence of chips with a corresponding despreading chip sequence. When the chip sequence has been demodulated at the receiver, and the corresponding symbols thus have been reconstructed, the symbols of each path are delayed with respect to the last path received, and this will compensate for the delay of each path. Note that the receiver comprises one "finger" (branch) for each path to be processed. The paths are thus time-aligned to each other and combined to form a composite symbol that is expected to have a higher signal-to-noise ratio (SNR) than a symbol received in a single path. In order to combine the different paths meaningfully, channel parameters such as number of paths, delays and attenuation of each path must be known. A major problem in particular is that the characteristics of the paths vary with time, due to the fact that the receiver is mobile. These varying characteristics must be adjusted dynamically, and that is a highly complex process.

When combining the symbols by summing each path, another problem arises. Assume that a symbol is received from a first base station (BS1) and has to be delayed and time-aligned with a subsequently received symbol from a second base station (BS2). The delay T is represented by an integral number (I) of symbol periods and a variable delay portion (D) for adjusting the alignment of symbols. If the mobile moves towards BS1 while remaining at the same distance from BS2, the delay applied to the symbol originating from BS1 should be increased to keep the two symbols aligned due to this time drift. To align a symbol received from BS1 at time t to a symbol received from BS2 at time t+D, it is necessary to adjust (delay) the symbol of BS1 with the amount D. The symbols of BS1 may then be aligned with the symbols of BS2 such that the boundary of a symbol relating to BS1 is aligned with the boundary of a symbol relating to BS2. However, a problem may still arise: after the symbol of BS1 has been subject to the delay D, a BS1 symbol of order K+1 may be aligned with a BS2 symbol of order K, and not with a BS2 symbol of order K+1, which is required to produce a coherently composite symbol. The symbol of BS1 must then be delayed by I, i.e. one symbol period, in order for the BS1 symbol of order K to become aligned to the BS2 symbol of order K. The total delay T is thus I+D in this specific example. This is known as symbol alignment. Thereafter, symbols of each path may be coherently combined to create a composite symbol.

As the mobile moves towards BS1, the delay will increase and, consequently, the delay T must be increased by 2×I, 3×I, 4×I etc. Note that the adjustment delay D varies between zero and one symbol period I and must continuously be applied to the path of BS1. When implementing the delay adjustment in the mobile phone, delay line units are employed, one for each path. To comply with real-time requirements of the system in which the mobile is comprised, there is an upper limit to the amount of delay that each delay line unit can be allowed to insert.

This maximum delay is referred to as delay line maximum length, DLM. When the delay of two multi-path symbols exceeds this maximum delay, symbol alignment is no longer possible, and symbols relating to the path of BS1 will consequently be lost. This has the effect that there can be no combination of symbols from BS1 with symbols from BS2. Thus, the worst case scenario in this example is that only symbols relating to BS2 will be received.

The delay line unit of the path relating to BS1 will then be "reset", which means that if the DLM is e.g. 5×I, the new value of the delay is set to 3×I and again, another attempt to align the path relating to BS1 with the path relating to BS2 will be undertaken, this time with new timing (delay) parameters. The resetting of the delay line has the effect that the symbols in delay line positions 4×I and 5×I are lost.

A more preferable way to perform the symbol alignment is to, once again, make an adjustment of the path pertaining to BS1 by applying the delay D such that the boundary of a symbol relating to BS1 is aligned with the boundary of a symbol relating to BS2. Thereafter, as in the previous example, a BS1 symbol of order K+1 may be aligned with a BS2 symbol of order K, and not with a BS2 symbol of order K+1, which is required to produce a coherently composite symbol. The symbol of BS1 must then be delayed by I, i.e. one symbol period, in order for the BS1 symbol of order K to become aligned with the BS2 symbol of order K. However, if the maximum delay is reached, a coherent adding of symbols can no longer be accomplished. Therefore, both paths are subject to delays, and when the maximum delay is reached, the symbol of order K is omitted in both paths. This has the practical effect that the path of BS1 can be delayed one more symbol period at the expense of a completely lost symbol of order K (and of course at the expense of a slight delay of received symbols for the path pertaining to BS2 as these are no longer received in real-time). The omitting of symbols is referred to as time drift compensation.

If the mobile moves away from BS1 while remaining at the same distance from BS2, the delay applied to the symbols originating from BS1 should be decreased to keep the paths aligned due to this time drift. This case is symmetrical to the case where a symbol is omitted in both paths. Consequently, the symbol of order K relating to BS1 will not be omitted, but employed twice, i.e. summed twice with the symbol of order K pertaining to BS2.

In practice, not only two, but N different paths are coherently summed. Two major problems arise when combination of symbols is to be undertaken. First, the instant in time when symbols are to be omitted depends on path timing characteristics, and will vary for all paths. Second, in the above examples, it was assumed that BS2 was the reference while the timing of BS1 was adjusted. However, the symbols derived from BS2 may disappear due to fading, which has the effect that timing control and decisions taken to omit/repeat symbols must be done in relation to a new reference path. These problems will make the management of time-drift compensation difficult.

Implementation of a common delay line located before the demodulators and processing units has been described in French patent application No. 02 10452 of 21 Aug. 2002. The main difference compared to the previous delay line implementations is that, in this case, the delays are applied to the chips rather than to the symbols. This has a major impact on performance loss of the receiver, since a chip is omitted instead of a complete symbol, i.e. only 1/N out of a symbol consisting of N chips is omitted/repeated by this operation. The delay adjustments will occur at a factor N more occasions than in the case where the delays are applied on a symbol level, but these N compensations are performed on different symbols, so the modifying of chips is spread over N symbols, which minimizes the performance loss. Another major difference is that, at the output of the delay line, the fingers of the receiver are positioned to compensate for the propagation delays, so that the chips that originate from the respective propagation paths are output at the same instant of time. This has the effect that the position of each finger is changed simultaneously when a chip is omitted/repeated. This simplifies the software management as compared to prior art not employing a common delay line.

However, the receiver disclosed in French patent application No. 02 10452 of 21 Aug. 2002 still presents unacceptable performance losses. Another problem is that the software management, even though it has been simplified, is still rather complex.

SUMMARY OF THE INVENTION

An object of the present invention is to mitigate the above described problems and provide an efficient way of performing time drift compensation in a receiver and a set of dedicated resources to be implemented in the receiver to effect the time drift compensation.

A further object of the present invention is to provide improved performance gain of the receiver and simplified software management.

These objects are attained by a method of performing time drift compensation in a receiver according to claim 1 and a receiver for performing time drift compensation according to claim 10.

According to a first aspect of the invention, a method is provided in which a signal is received. Then, a control pulse is produced after a certain number of chips of the received signal has been received. A variable delay is applied to the received signal. The resulting delayed signal is provided to demodulation units in the receiver, in which delayed signal chips have been omitted or duplicated on the basis of the control pulse. A compensation signal is supplied to the demodulation units in the receiver, and this compensation signal indicates whether chips have been omitted or duplicated in the delayed signal. Finally, the delayed signal is demodulated such that the demodulation units consider the omission or duplication of chips in the delayed signal.

According to a second aspect of the invention, a receiver comprising a timer, a common delay unit and demodulation units is provided. The timer is arranged to produce a control pulse after having received a certain number of chips of a received signal. The common delay unit is arranged to apply a variable delay to the received signal and thus provide a delayed signal to the demodulation units in the receiver, in which delayed signal chips have been omitted or duplicated on the basis of the control pulse. Further, the timer is arranged to supply to the demodulation units in the receiver a compensation signal that indicates whether chips have been omitted or duplicated in the delayed signal. Moreover, the demodulation units are arranged to demodulate the delayed signal such that the demodulation units consider the omission or duplication of chips in the delayed signal.

The basic idea of the invention is that a receiver receives signals that originate from a transmitter. Before transmission, the transmitter translates each radio symbol into a sequence of bits by means of a spreading code. These bits are typically referred to as chips. These chips are then sent across an air interface and are subject to multipath propagation. In practice, this means that a given signal will, via a number of paths, arrive at the receiver at different instants of time due to different physical lengths of the paths. In prior art, this has been a problem and has caused undesired effects such as fading, delays and interference at the receiver. However, as previously described, it is also possible to benefit from multipath propagation by applying time drift compensation to the received signals, in order to eliminate the effects of internal delays among the received signals.

When a signal is received, i.e. a signal pertaining to one transmission path, a variable delay is applied to the signal in order to enable alignment of the delayed signal to a subsequently received signal. After having received a certain number of chips, a control pulse is produced, and this control pulse controls the variable delay applied to the received signal. The delay is effected in a common delay unit, and each output of the common delay unit relates to one propagation path. These outputs are typically referred to as fingers.

In the delayed signal, chips may have been omitted or duplicated to compensate for time drift. The omission or duplication of chips is also controlled by the control pulse. This delayed signal is thereafter supplied to demodulation units in the receiver. These demodulation units are employed to reconstruct the symbol that was initially translated into a number of chips at the transmitter. To these demodulation units, a compensation signal is provided that indicates whether chips have been omitted or duplicated in the delayed signal. This is necessary for the demodulation units to consider the omission or duplication of chips in the delayed signal when demodulating the delayed signal, and thereby make a correct demodulation of the chips.

The present invention is advantageous for a number of reasons, firstly since the variable delays are applied to the chips rather than to the symbols. This greatly decreases the performance loss of the receiver, since a chip is omitted instead of a complete symbol. Only 1/N of a symbol consisting of N chips is omitted/repeated by this operation. The delay adjustments will occur N times more than in the case where the delays are applied on a symbol level, but these N compensations are spread over many symbols, so the performance loss is decreased. Secondly, at the output of the common delay unit, the fingers of the receiver are operated to accomplish time drift compensation, so that the chips that originate from the respective propagation paths are output, i.e. the position of a finger is altered, at the same instant of time. This greatly simplifies the software management of the receiver.

According to an embodiment of the invention, the compensation signal is synchronized with the control pulse. Thus, the frequency of the compensation signal equals the frequency of the control pulse. This is to ensure that the compensation signal occurs as often as the control pulse does. Preferably, on each occasion that time drift compensation is achieved by means of omission or duplication of chips in the received signal, the compensation signal shall notify the demodulation units thereof.

According to another embodiment of the invention, the control pulse is aligned with a symbol boundary. In UMTS, one slot is equal to a sequence of 2560 chips. When no time drift compensation is to be effected in the receiver, the control pulse is activated after the reception of one complete slot, i.e. 2560 chips. However, when time drift compensation is to be undertaken, the control pulse will be activated after 2559 chips of one slot has been received in case of chip omission, or after 2561 chips has been received in case of chip duplication.

According to a further embodiment of the invention, the received signal comprises both data chips and pilot chips and the demodulation is performed in a first and a second demodulation unit. The received pilot chips are demodulated in the first demodulation unit to produce demodulated pilot chips, and the received data chips are demodulated in the second demodulation unit to produce demodulated data chips. The use of a pilot channel enables channel estimation by means of transmitting a predefined chip sequence over the channel. By employing a pilot channel, the receiver can compute an estimate of the channel and take this estimate into account when reconstructing the symbols.

According to yet further embodiments of the invention, the compensation signal is given a first value which indicates that a chip has been omitted in the delayed signal and a second value which indicates that a chip has been duplicated in the delayed signal.

The demodulation of chips is performed by first descrambling the delayed chips and than despreading the descrambled chips. The reconstruction of a symbol is effected by integrating the demodulated pilot chips to create a pilot symbol and the demodulated data chips to create a data symbol. The first and second values of the compensation signal control scrambling codes and spreading codes provided to the demodulation units such that a chip is omitted in the respective code on reception of the first value and a chip is duplicated in the respective code on reception of the second value. The first and second values of the compensation signal further control the integrators such that a chip is omitted in the integration on reception of the first value, and a chip is duplicated in the integration on reception of the second value.

According to still another embodiment of the invention, the first demodulation unit delivers channel estimation information derived from the pilot symbol to the second demodulation unit. The second demodulation unit employs the channel estimation information to improve the data symbol by taking into account channel parameters. The second demodulation unit advantageously performs de-rotation processing on the data symbols based on the channel estimation information from the first demodulation unit. Thereafter, the data symbols are processed by decoders and delivered to higher layer processors. By performing the derotation, the phase rotation caused by the channel can be eliminated.

Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The preferred embodiments of the present invention will be described in detail in the following with reference made to the accompanying drawings, in which.

DESCRIPTION OF THE PREFERRED EMBODIMENTS

Figure 1:
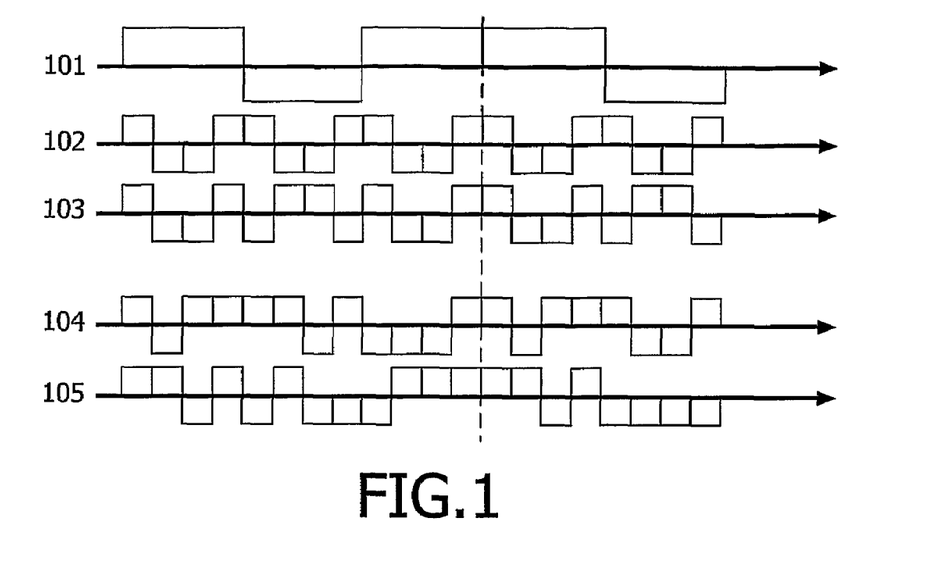
FIG. 1 shows a timing diagram of the processing of symbols at a transmitter in UMTS to create a chip sequence to be sent over the air interface.

In UMTS, spreading is used at the transmitting side, i.e. at the base station, to translate each symbol into a sequence of bits. Each symbol is multiplied with a spreading code comprising N bits, or chips, per symbol. The number N of chips in the spreading code is typically known as the spreading factor (SF). The value of SF varies from 4 to 256 depending on the data channel, but in case of the pilot channel employed in the mobile phone receiver, SF is set to 256. FIG. 1 shows the spreading of five symbols 101 with a spreading code 102 having SF=4. The resulting code is shown at 103. Thereafter, each chip is modulated with a scrambling code 104 over a sequence of 38400 chips. FIG. 1 shows the first 20 chips of the scrambling sequence. The chips, after having been subject to spreading and scrambling, are shown at 105. The dotted line indicates a slot boundary.

Figure 2:
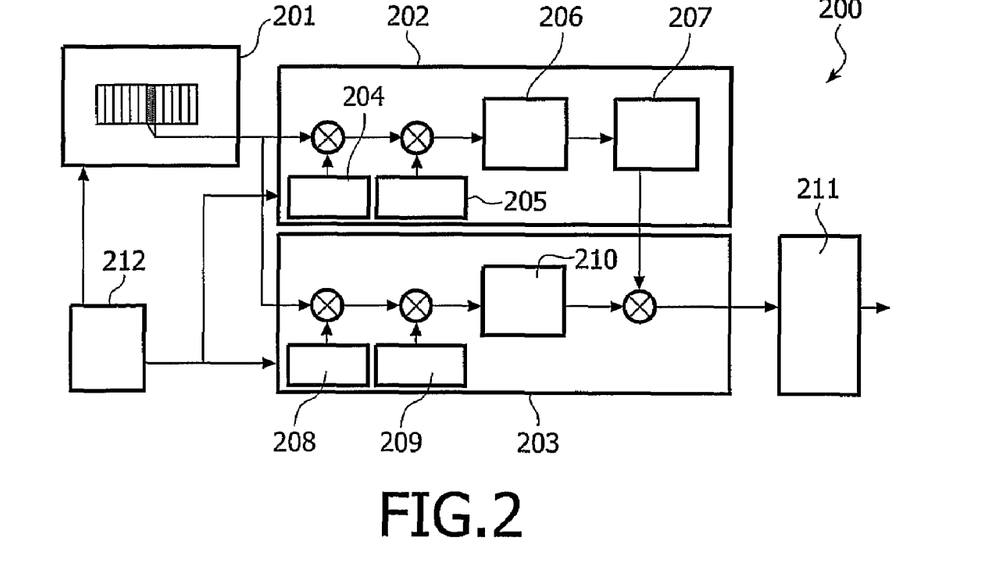
FIG. 2 shows a block diagram of a prior art receiver employed in UMTS, in which receiver the present invention can advantageously be implemented.

Thus, a two-stage modulation technique is employed at the receiver. A prior art receiver is schematically shown in FIG. 2, in which the present invention can advantageously be implemented. The receiver 200 receives signals that have been transmitted to the receiver via different propagation paths, i.e. one signal carrying a set of channels is transmitted via a first path, another signal carrying a set of channels is transmitted via a second path, still another signal carrying a set of channels is transmitted via a third path etc. Different delays are applied, by means of the delay unit 201, to the different signals depending on the characteristics of the path through which the respective signal propagates.

After having passed the common delay unit 201, the signals are supplied to a first demodulation unit, i.e. a master rake 202 and a second demodulation unit, i.e. a slave rake 203. The receiver 200 shown in FIG. 2 is able to handle demodulation of a signal relating to one propagation path. An output of the delay unit 201, which output corresponds to a specific path, is referred to as a finger. For each additional signal that is to be processed, an additional finger is required (and thereby an additional master and slave rake).

The master rake 202 comprised in each finger demodulates received predefined chips that are transmitted over a pilot channel. First, the pilot chips are descrambled, i.e. demodulated by a scrambling code provided by a master scrambling code generator 204. Second, the descrambled chips are despread, i.e. demodulated by a spreading code provided by a master spreading code generator 205. Thereafter, a first master integrator 206 performs an integration over 256 chips to reconstruct one pilot symbol. A second master integrator 207 performs an integration over four symbols and delivers channel estimation information to the slave rake 203. The slave rake 203 first descrambles chips corresponding to the actual data channel, i.e. the channel associated with the propagation path for which timing compensation is to be undertaken. The descrambling is performed by means of a slave scrambling code generator 208. A slave spreading code generator 209 is then employed to perform the despreading of data chips. A slave integrator 210 performs an integration over SF chips to reconstruct one pilot symbol.

The slave rake performs de-rotation processing on the data symbols based on the channel estimation information from the master rake 202. Thereafter, the data symbols are processed by decoders 211 and delivered to higher layer processors.

The despreading and descrambling code generators 204, 205, 208, 209, the integrators 206, 210 and the delay unit 201 must be synchronized with the received chip sequence in order to correctly reconstruct the symbols of each path. In accordance with the present invention, a control pulse—a slot pulse—is supplied to the delay unit 201, and a first and a second compensation signal is supplied to the master rake 202 and the slave rake 203, and thus to the despreading and descrambling code generators 204, 205, 208, 209 and the integrators 206, 210 comprised in the rakes.

This synchronization is performed by the timer 212, and will be described in detail in the following. Note that it is possible to perform the demodulation without a pilot tone and, thus, without the master rake 202. However, it would in that case not be possible to provide the slave rake 203 with channel estimation information. Consequently, the performance of the receiver 201 would be severely degraded.

In UMTS, following definitions are used:
one frame is equal to a sequence of 38400 chips, i.e. the length of the scrambling code.
one slot is equal to a sequence of 2560 chips, i.e. one frame comprises 15 slots.
each pilot symbol is made up of 256 chips, i.e. one slot comprises 10 pilot symbols.
each data symbol is made up of SF chips, i.e. one slot comprises 2560/SF data symbols.

To synchronize the code generators 204, 205, 208, 209 and the delay unit 201 with the received chip sequence, a slot recurrence pulse is employed. This slot pulse indicates the end of the present slot, i.e. the next chip that is received after the slot pulse is the first chip in the next slot. The slot pulse is provided by the timer 212 and serves as a common timing reference for the master rake 202, the slave rake 203 and the delay unit 201. (The chip position affected by the timing compensation will always be the last position in one slot). The slot pulse is used by the master rake 202, the slave rake 203 and the delay unit 201 to store the values of parameters used for the slot to come, in particular for programming of delays in the common delay unit 201. Due to timing compensation, the slot pulse frequency is bound to change. When timing compensation is performed, the slot pulse frequency must be changed such that the number of chips—the number nominally equals 2560—in next slot will be extended to 2561 chips or reduced to 2559 chips.

Figure 3:
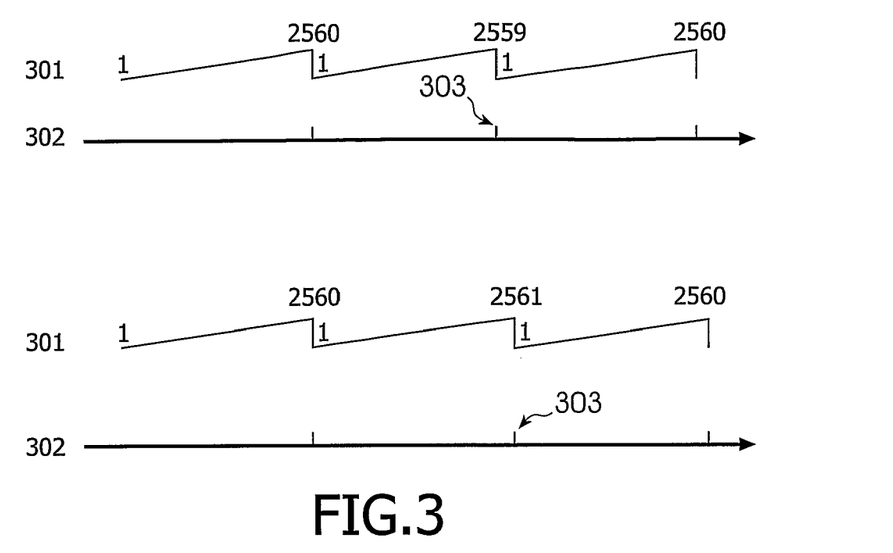
FIG. 3 shows a simplified timing diagram that illustrates the performance of slot reduction and slot extension in accordance with an embodiment of the invention.

In FIG. 3, in which the waveform at 301 indicates the chip number in each slot, starting from 1 and ending at (nominally) 2560, and the slot pulse waveform is shown at 302. The upper portion of FIG. 3 illustrates that, in case slot reduction is performed, chip number 2560 will be omitted due to the fact that the slot pulse is activated 303 before chip number 2560 is output from the delay line unit, i.e. after chip number 2559 has been output. The lower portion of FIG. 3 illustrates that, in case slot extension is performed, chip number 2561 will be added, and consequently the slot pulse is activated 303 after chip number 2561 is output from the delay line unit. When a time drift compensation is employed, the delay values of the common delay unit 201 must be changed in accordance with the changed slot pulse frequency, in order to omit/repeat the last chip in the slot.

Figure 4:
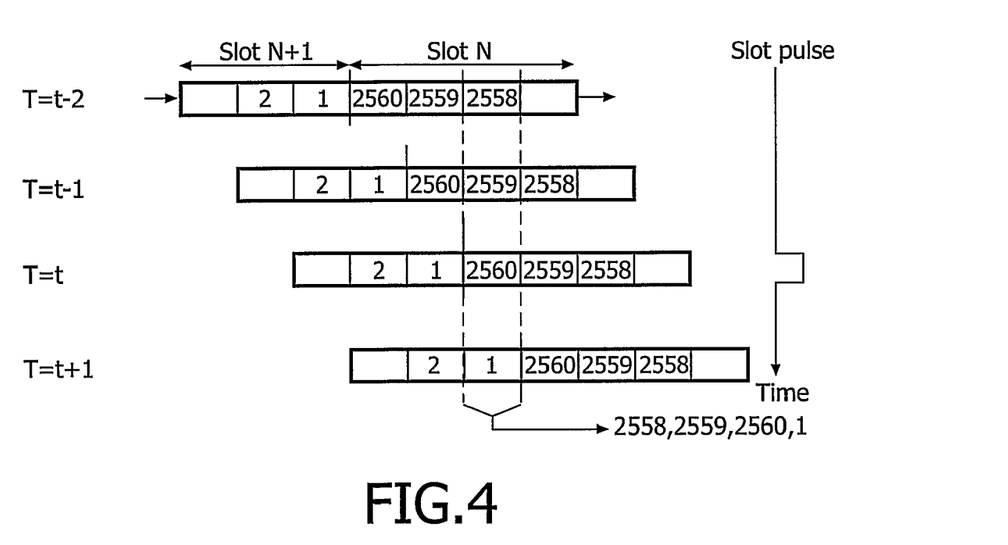
FIG. 4 illustrates outputting of chips from the delay unit when no compensation is effected.

FIG. 4 shows how the chips of each slot are output from the delay unit 201 in relation to the slot pulse in a case where no compensation is effected. Thus, the chip sequence output from the delay unit 201 is . . . 2558, 2559, 2560, 1 . . . .

Figure 5:
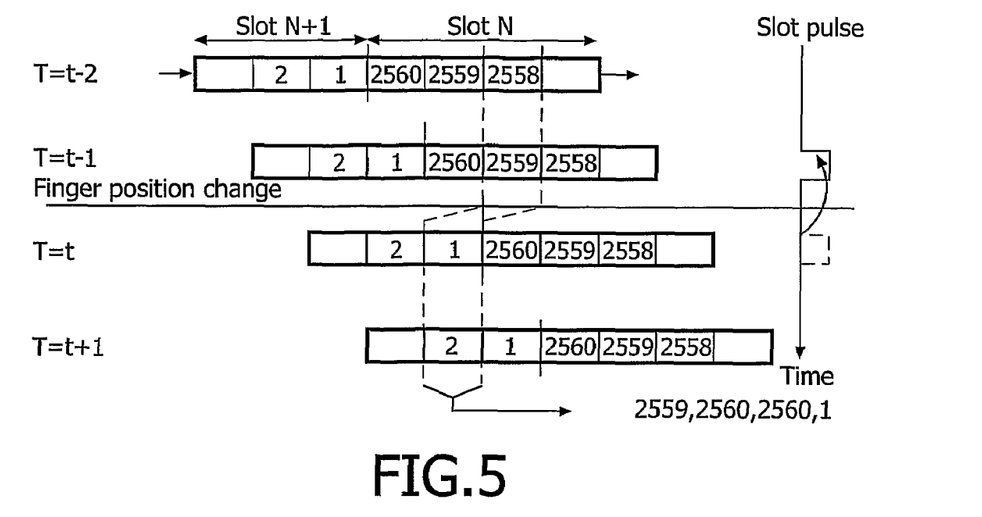
FIG. 5 illustrates the outputting of chips from the delay unit when compensation in the form of chip omission is effected.

FIG. 5 shows how the chips are output from the delay unit 201 in relation to the slot pulse in a case where compensation is effected. As can be seen, slot reduction is performed which is a result of the fact that the slot pulse is activated at a time corresponding to chip number 2559. Consequently, chip number 2560 is omitted, and the chip sequence output from the delay unit 201 is . . . 2558, 2559, 1, 2 . . . .

Figure 6:
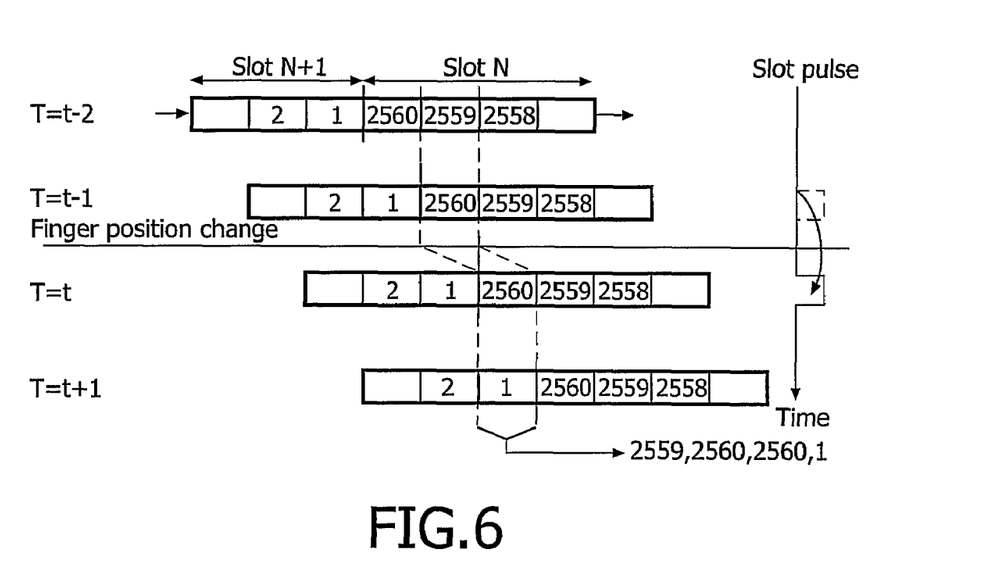
FIG. 6 illustrates the outputting of chips from the delay unit when compensation in the form of chip duplication is effected.

FIG. 6 shows how the chips are output from the delay unit 201 in relation to the slot pulse in a case where compensation is effected. As can be seen, slot extension is performed which is a result of the fact that the slot pulse is activated at a time corresponding to chip number 2561. Consequently, chip number 2560 is repeated, and the chip sequence output from the delay line is . . . 2559, 2560, 2560, 1 . . . .

To perform time drift compensation as provided by the present invention, a symbol number counter must be employed at the receiver to count the number of each symbol in a slot, i.e. 1-10 in the master rake 202 and 1-2560/SF in the slave rake 203. This counter is supplied with the number of the symbol for which compensation is to be achieved.

Figure 7:
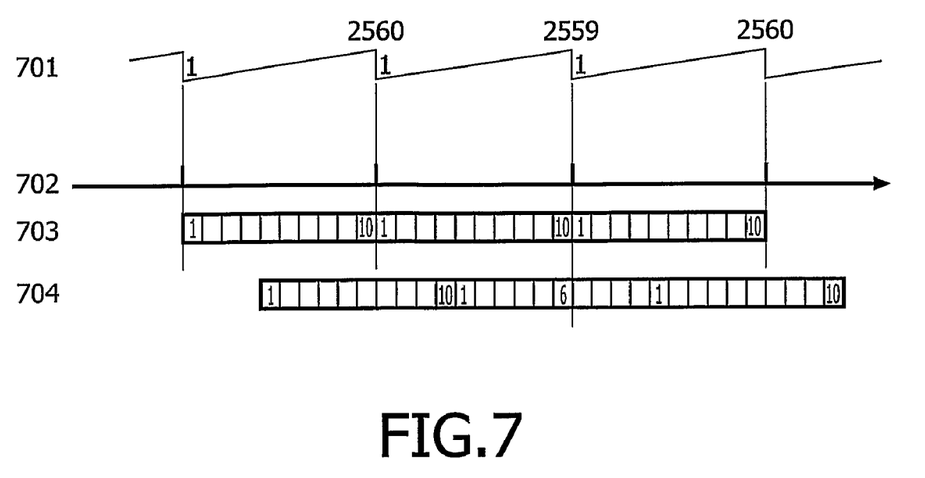
FIG. 7 shows time-alignment of symbol boundaries for delayed channels.

Note that the symbol for which compensation is accomplished in a slot is not necessarily symbol number 10 (for the master rake 202) and symbol number 2560/SF (for the slave rake 203). In UMTS, several channels are received simultaneously. These channels can be delayed in relation to each other, and the symbol boundaries of these delayed channels will be time-aligned, but a symbol can be shifted relative to other channels. This is illustrated in FIG. 7, in which the waveform at 701 indicates the chips in each slot, starting from 1 and ending at 2560 (or possibly 2559 or 2561), the signal at 702 indicates the slot pulse occurrence, the signal at 703 illustrates the symbols of a first pilot channel and the signal at 704 illustrates the symbols of a second pilot channel. It can be seen in this specific example that, in case of a slot reduction, the last chip of symbol number 10 is omitted for the first pilot channel and the last chip of symbol number 6 is omitted for the second pilot channel.

As mentioned hereinabove, when a slot extension is effected, there is an "extra" chip in the corresponding slot. This extra chip is a result of the shift of fingers in the common delay unit 201 and shall not be considered. This is done by limiting the integration 206, 210 in the demodulation operation to operate on 256 chips (for the master rake 202) and 2560/SF chips (for the slave rake 203). However, the integrators 206, 210 shall wait for the duration of one chip, which duration corresponds to the extra chip, before demodulation of the next symbol is performed. When a slot extension is effected, the last chip will be repeated and thus the integrators 206, 210 will sum that last chip twice.

When a compensation is to be performed in accordance with the present invention, i.e. a chip omission or a chip repetition is effected, a compensation signal which is synchronized with the slot pulse is supplied to the code generators 204, 205, 208, 209 by the timer 212. The compensation signal has a first value to indicate a chip omission, and a second value to indicate a chip repetition. The compensation signal is also supplied to the integrators 206, 210 to ensure a correct integration operation. The timer 212 synchronizes the compensation signal with the slot pulse such that they are submitted to generators and integrators concerned at the same instant of time that the slot pulse is submitted to the delay unit 201.

Figure 8:
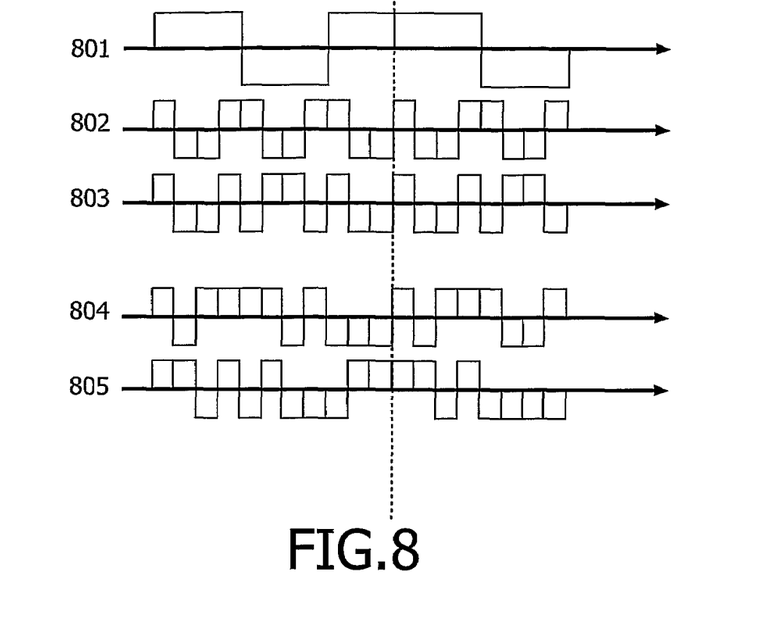
FIG. 8 shows a timing diagram of the processing of symbols and chips at the receiver when performing chip omission in accordance with the present invention.

FIG. 8 illustrates the operation of the code generators 204, 205, 208, 209 and the integrators 206, 210 when an omission of a chip is performed. The despreading of five symbols indicated at 801 is undertaken with a spreading code indicated at 802, which has SF=4. The resulting code is shown at 803. Thereafter, each chip is demodulated with a scrambling code 804 over a sequence of 38400 chips. FIG. 8 shows the first 19 chips of the scrambling sequence. The chips, after having been subject to spreading and scrambling, are shown at 805. The dotted line indicates a slot boundary. From FIG. 8, it can be seen that in the last symbol of the slot, one chip is omitted. This has the effect that the scrambling and spreading code generators 204, 205, 208, 209 must omit the code that corresponds to the last chip in the slot. In FIG. 8, this is illustrated by the spreading code at 802 and the scrambling code at 804; for the last symbol in the slot, there are only three corresponding chips instead of four. Further, the integrators 206, 210 must perform the integration by duplicating the last chip in the slot. Thus, in the chip sequence at 805, the last chip in the slot must be summed twice.

Figure 9:
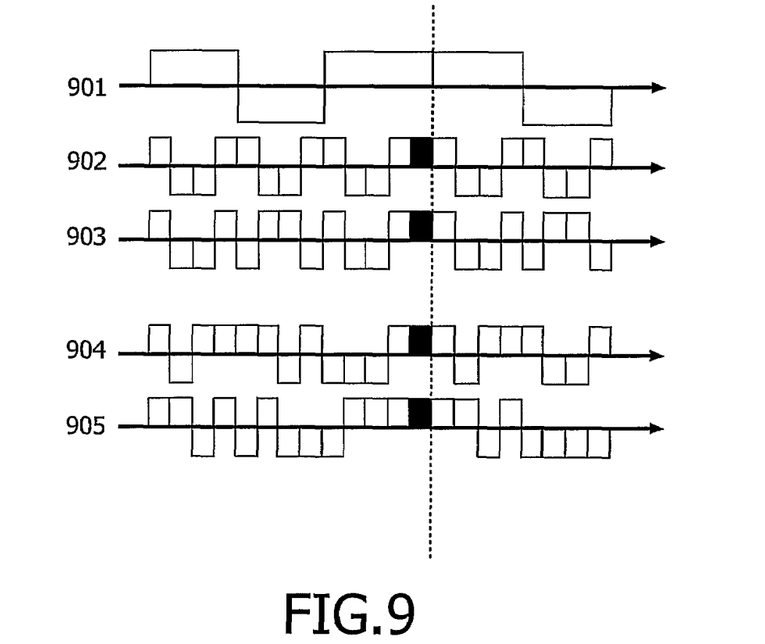
FIG. 9 shows a timing diagram of the processing of symbols and chips at the receiver when performing chip duplication in accordance with the present invention.

FIG. 9 illustrates the operation of the code generators 204, 205, 208, 209 and the integrators 206, 210 when a repetition of a chip is performed. Like reference numerals indicate equivalence with the signals shown in FIG. 8. In FIG. 9, it can be seen that in the last symbol of the slot, one chip is repeated. Consequently, the scrambling and spreading code generators 204, 205, 208, 209 must repeat the code that corresponds to the last chip in the slot. In FIG. 9, this is illustrated by the spreading code at 902 and the scrambling code at 904; for the last symbol in the slot, there are five corresponding chips instead of four. Further, the integrators 206, 210 must perform the integration by omitting the last chip in the slot. Thus, in the chip sequence at 905, the last chip in the slot must be excluded. The references 901 and 903 have to be compared to references 801 and 803 on the FIG. 8.

Thus, to perform time drift compensation in accordance with the present invention, a number of resources are required in the receiver of FIG. 1.

For slot reduction, a slot pulse must be generated which is located at a distance of 2559 chips from the last slot pulse. Slot pulses are generated by the timer 212 and sent to the common delay unit 201, such that the delay of each finger is synchronized with the slot pulse as shown in FIG. 4-6. Slot reduction in particular is illustrated in FIG. 5. In case slot reduction is to be performed, the slot pulse is also synchronized with the first compensation signal, which in this case has a first value, sent to the scrambling and spreading code generators 204, 205, 208, 209 in order to indicate to the generators when to omit the code that corresponds to the last chip in the slot. Moreover, the compensation signal notifies the integrators 206, 210 that the last chip in the slot must be duplicated when performing the integration as shown in FIG. 8.

For slot extension, a slot pulse must be generated which is located at a distance of 2561 chips from the last slot pulse. The timer 212 generates slot pulses and sends them to the common delay unit 201, such that the delay of each finger is synchronized with the slot pulse as shown in FIGS. 4-6. Slot extension in particular is illustrated in FIG. 6. In case slot extension is to be performed, the slot pulse is also synchronized with a compensation signal of a second value, which signal is sent to the scrambling and spreading code generators 204, 205, 208, 209 in order to indicate to the generators when to duplicate the code that corresponds to the last chip in the slot. The compensation signal also notifies the integrators 206, 210 that the last chip in the slot must be excluded when performing the integration as shown in FIG. 9.

Even though the invention has been described with reference to specific exemplifying embodiments thereof, many different alterations, modifications and the like will become apparent to those skilled in the art. The embodiments described are therefore not intended to limit the scope of the invention, as defined by the appended claims.

The invention claimed is:

1. A method of performing time drift compensation in a receiver, the method comprising the steps of:
   receiving a signal comprising both data chips and pilot chips;
   producing a control pulse after having received a certain number of chips of the received signal;
   controlling a variable delay applied to the received signal;
   sending, to demodulation units in the receiver, a delayed signal in which chips have been omitted or duplicated on the basis of said control pulse;
   supplying, to said demodulation units in the receiver, a compensation signal that indicates whether chips have been omitted or duplicated in the delayed signal; and
   demodulating in a first and a second demodulation unit the delayed signal such that the demodulation units consider the omission or duplication of chips in the delayed signal and demodulating the received pilot chips in the first demodulation unit to produce demodulated pilot chips and the received data chips in the second demodulation unit to produce demodulated data chips.

2. The method according to claim 1, further comprising the step of synchronizing the compensation signal to the control pulse.

3. The method according to claim 1, further comprising the step of aligning said control pulse with a symbol boundary.

4. The method according to claim 1, wherein the compensation signal is given a first value which indicates that a chip has been omitted in the delayed signal and a second value which indicates that a chip has been duplicated in the delayed signal.

5. The method according to claim 1, wherein the step of demodulating chips comprises the steps of:
   descrambling the delayed chips; and
   despreading the descrambled chips.

6. The method according to claim 1, further comprising the step of:

integrating the demodulated pilot chips to create a pilot symbol and the demodulated data chips to create a data symbol.

7. The method according to claim 6, wherein said first and second values of the compensation signal control scrambling codes and spreading codes sent to the demodulation units such that a chip is omitted in the respective code on reception of a compensation signal having a first value, and a chip is duplicated in the respective code on reception of a compensation signal having a second value, and wherein said first and second value of the compensation signal further control the integrators such that a chip is omitted in the integration on reception of the first value, and a chip is duplicated in the integration on reception of the second value.

8. The method according to claim 7, further comprising the steps of:
   delivering, from the first demodulation unit to the second demodulation unit channel estimation information derived from the pilot symbol; and
   employing said channel estimation information at the second demodulation unit to improve said data symbol by taking into account channel parameters.

9. A receiver for performing time drift compensation, the receiver comprising:
   a timer;
   a common delay unit; and
   demodulation units, wherein the timer is arranged to produce a control pulse after having received a certain number of both data chips and pilot chips of a received signal;
   the common delay unit is arranged to apply a variable delay to the received signal and thus send a delayed signal to the demodulation units in the receiver, in which delayed signal chips have been omitted or duplicated on the basis of said control pulse;
   the timer is further arranged to supply, to said demodulation units in the receiver, a compensation signal whether chips have been omitted or duplicated in the delayed signal; and
   the demodulation units are arranged to demodulate in a first demodulation unit the received pilot chips to produce demodulated pilot chips, in a second demodulation unit the received data chips to produce demodulated data chips, and the delayed signal such that the demodulation units consider the omission or duplication of chips in the delayed signal.

10. The receiver according to claim 9, wherein the timer is further arranged to synchronize the compensation signal to the control pulse.

11. The receiver according to claim 9, wherein the timer is further arranged to align said control pulse with a symbol boundary.

12. The receiver according to claim 9, wherein the timer is further arranged to give the compensation signal a first value which indicates that a chip has been omitted from the delayed signal and a second value which indicates that a chip has been duplicated in the delayed signal.

13. The receiver according to claim 9, wherein the demodulation units comprises:
   descrambling code generators employed to descramble the delayed chips; and
   despreading code generators employed to despread the descrambled chips.

14. The receiver according to claim 9, wherein the demodulation units comprises:
   integrators arranged to integrate the demodulated pilot chips to create a pilot symbol and the demodulated data chips to create a data symbol.

15. The receiver according to claim 9, wherein said first and second values of the compensation signal control scrambling codes and spreading codes supplied to the demodulation units such that a chip is omitted from the respective code on reception of a compensation signal having a first value, and a chip is duplicated in the respective code on reception of a compensation signal having a second value, and wherein said first and second value of the compensation signals further control the integrators such that a chip is omitted in the integration on reception of the first value, and a chip is duplicated in the integration on reception of the second value.

16. The receiver according to claim 15, further comprising:
   a channel estimation integrator arranged to deliver, from the first demodulation unit to the second demodulation unit channel estimation information derived from the pilot symbol, wherein said channel estimation information is employed at the second demodulation unit to improve said data symbol by taking into account channel parameters.

17. A receiver for performing time drift compensation, the receiver comprising:
   a timer;
   a common delay unit; and
   demodulation units,
   wherein the timer is arranged to produce a control pulse after having received a certain number of chips of a received signal,
   wherein the common delay unit is arranged to apply a variable delay to the received signal and thus send a delayed signal to the demodulation units in the receiver, in which delayed signal chips have been omitted or duplicated on the basis of said control pulse,
   wherein the timer is arranged to supply, to said demodulation units in the receiver, a compensation signal that indicates whether chips have been omitted or duplicated in the delayed signal,
   wherein the demodulation units are arranged to demodulate the delayed signal such that the demodulation units consider the omission or duplication of chips in the delayed signal, and
   wherein the received signal comprises both data chips and pilot chips and the demodulation is performed in a first and a second demodulation unit, the first demodulation unit being further arranged to demodulate the received pilot chips to produce demodulated pilot chips and the second demodulation unit being further arranged to demodulate the received data chips to produce demodulated data chips.

18. The receiver according to claim 17, wherein said first and second values of the compensation signal control scrambling codes and spreading codes supplied to the demodulation units such that a chip is omitted from the respective code on reception of a compensation signal having a first value, and a chip is duplicated in the respective code on reception of a compensation signal having a second value, and wherein said first and second value of the compensation signals further control the integrators such that a chip is omitted in the integration on reception of the first value, and a chip is duplicated in the integration on reception of the second value.

19. The receiver according to claim 17, further comprising:
   a channel estimation integrator arranged to deliver, from the first demodulation unit to the second demodulation unit, channel estimation information derived from the pilot symbol, wherein said channel estimation information is employed at the second demodulation unit to improve said data symbol by taking into account channel parameters.

* * * * *